E. PARKER.
Method of Fastening Porcelain and Other Knobs to their Shanks.

No. 206,605. Patented July 30, 1878.

WITNESSES.

INVENTOR.

UNITED STATES PATENT OFFICE.

EMERY PARKER, OF NEW BRITAIN, CONNECTICUT, ASSIGNOR TO THE RUSSELL & ERWIN MANUFACTURING COMPANY, OF SAME PLACE.

IMPROVEMENT IN THE METHODS OF FASTENING PORCELAIN AND OTHER KNOBS TO THEIR SHANKS.

Specification forming part of Letters Patent No. 206,605, dated July 30, 1878; application filed July 12, 1878.

*To all whom it may concern:*

Be it known that I, EMERY PARKER, of New Britain, in the county of Hartford and State of Connecticut, have invented a new and Improved Method of Fastening Porcelain, Mineral, Composition, and other Knobs to their Shanks, the said improvement being fully described in the following specification and illustrated in the accompanying drawing, making a part of the same, in which—

Figure 1:
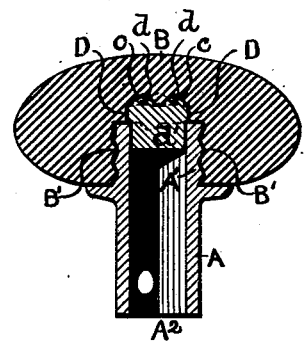
Figure 2:
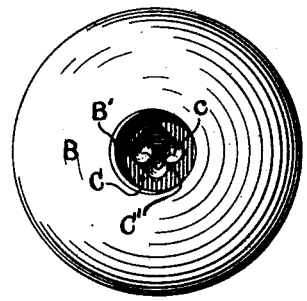
Figure 3:
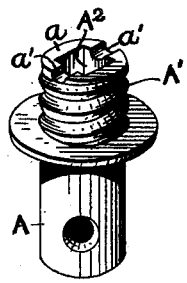
Figure 4:
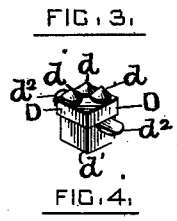

Figure 1 represents a vertical section of a knob with shank attached. Fig. 2 shows a bottom view of the knob without a shank. Fig. 3 is a perspective view of the shank, and Fig. 4 shows, in perspective, the shape assumed by the lead filling.

My invention relates to an improvement in the method of fastening door-knobs to their shanks, it being especially useful in securing the parts of porcelain, mineral, glass, and knobs of other material; and consists, first, in so constructing the wall of the chamber in the knob and the entering portion of the shank that the parts cannot be separated or loosened by a longitudinal pull; and, second, by so shaping the bottom of the said chamber that a lead filling in the form of a plug or dowel shall prevent the parts from becoming detached or loosened by rotary motion, the said method being simple, and furnishing perfect security of attachment without the liability of breaking or cracking the knobs, and the fastening being accomplished at a much less cost for lead than has attended the usual methods of construction.

Prior to my invention, knobs of this character have usually been fastened to their shanks by providing the knob with an annular chamber whose shape has been that of a frustum of a cone, with the base of greater area in the interior of the knob, and giving to the entered or binding portion of the shank a similar shape; or, as in some cases, providing the end of the shank with dovetail slots, then filling with lead the space between the binding portion of the shank and the wall of the chamber in the knob, and setting this lead filling with a punch to secure the shank firmly in place. Many cracked and broken knobs, particularly those of porcelain, result from the method of fastening, the damaging causes being the heat, from the amount of lead employed, and the operation of setting the filling. This method has also been ineffectual as regards security, the parts often becoming loosened or separated, and, owing to the amount of lead required, has been comparatively expensive.

The objects, therefore, of my invention are to furnish a simple and perfectly secure fastening, without the liability of cracking or breaking the knobs by heat, or by the operation of setting the filling, and to greatly reduce the expense of the lead filling by using a less quantity, thereby creating a saving in large establishments of from ten to twenty-five dollars per day.

Referring to the drawing, my improved method of fastening will be readily understood.

It consists in providing the binding portion $A^1$ of the shank A, Figs. 1 and 3, with a screw-thread, preferably cast upon the shank, and furnishing to the knob B an annular chamber, whose wall, B', is threaded for engagement with the said shank, preventing, when the parts are combined, their separation by a longitudinal pull. The danger of separation and looseness also springs from the partial rotary motion given to the knob when in use, and these highly objectionable results are effectually prevented by the construction now to be described. As shown in Figs. 1 and 2, the bottom C of this chamber in the knob B is provided with a cavity, C', say, one-sixteenth of an inch deep, whose wall is in the shape of a three, four, or more sided polygon, or figure other than a circle, and this cavity C' is furnished with one or more supplemental and auxiliary cavities, c, in the form of a cone or other preferable shape, the said supplemental cavities (if more than one are used) being arranged in the cavity C' so as to give to the lead filling, hereinafter described, the requisite amount of strength.

The method of combining the parts is as follows: The shank A is screwed into the chamber in the knob until its end $a$ takes bearing on the bottom C of the chamber, when the parts are ready to receive the lead filling. This is introduced through a tube inserted into, and of the shape of, the spindle-hole $A^2$, Fig. 3, the said tube being provided with an external shoulder to gage the length inserted, which length is, say, from one-eighth to a quarter of an inch less than that of the whole shank. This tube is provided with a flat bottom, having in it a small hole, through which the melted lead passes, filling the cavities $C'$ and $c$, and also such portion of the spindle-hole as is not occupied by the tube, the said lead filling assuming in the main the shape shown in Fig. 4 of the drawing, where D represents that portion filling the cavity $C'$, $d$ that filling the supplemental cavity or cavities $c$, and $d^1$ that filling the adjacent end of the spindle-hole $A^2$.

Although the main cavity $C'$ is, as above specified, provided with supplemental cavities $c$, the presence of the cavities $c$ is not essential, as the main cavity $C'$ is of itself sufficient, when filled with lead, to prevent a separation or loosening of the parts by rotary motion. If, however, the said supplemental cavities are present, they will act to assist the main cavity $C'$ in the performance of its office. To offer still greater security against the separation or loosening of the shank and knob by rotary motion, the end $a$ of the shank may have one or more grooves, $a'$, into which the lead will flow, forming the projection $d^2$, (shown on the filling at Fig. 4,) although this is not necessary, as a filling whose shape is in the main that above described will securely perform its office.

The novel features of my invention consist in providing the wall of the chamber in the knob and that portion of the shank which enters it with a screw-thread, and then securing the combined parts against separation by rotary motion by means of a plug of soft metal, which, while in a state of fusion, is poured into the longitudinal cavity in the shank, the said plug being prevented from rotation upon its own axis by its engagement with the cavities in the knob and shank.

Instead of lead or other soft metal, sulphur may be used; or any other material which is fusible at a low temperature and becomes hard upon cooling, may be used with great advantage.

The advantages claimed for my improved method of fastening are simplicity, slight liability of breaking or cracking the knobs during the operation, securely combining the parts so that they cannot be separated or loosened by longitudinal or rotary motion, and, in case lead or other fusible metal is used for a filling, a great annual saving will be effected in the cost of the material required.

Having described my invention, what I claim, and desire to secure by Letters Patent, is—

1. The method of fastening porcelain, mineral, and other knobs to their shanks, consisting in combining the knob and shank by means of a screw-thread upon the exterior of the shank and interior of the knob, and a plug of soft metal, or other fusible substance, which in a state of fusion is introduced into cavities in the knob and shank, and, upon hardening, binds the two together, substantially as described.

2. As an article of manufacture, a porcelain, mineral, or other knob, consisting of a threaded shank and a head having a threaded socket, the said parts being held in attachment by a plug of soft metal or other fusible material entering a cavity in the head and the longitudinal cavity in the shank, and binding the knob and shank together, substantially as herein described.

EMERY PARKER.

Witnesses:
H. E. RUSSELL, Jr.,
THEO. E. SMITH.